Aug. 13, 1940.　　　G. V. ERICKSON　　　2,211,559
MAP HOLDING DEVICE
Filed Jan. 11, 1939　　　2 Sheets-Sheet 1

Inventor
GEORGE V. ERICKSON
BY
Chas. C. Reif
Attorney

Aug. 13, 1940.   G. V. ERICKSON   2,211,559
MAP HOLDING DEVICE
Filed Jan. 11, 1939   2 Sheets-Sheet 2
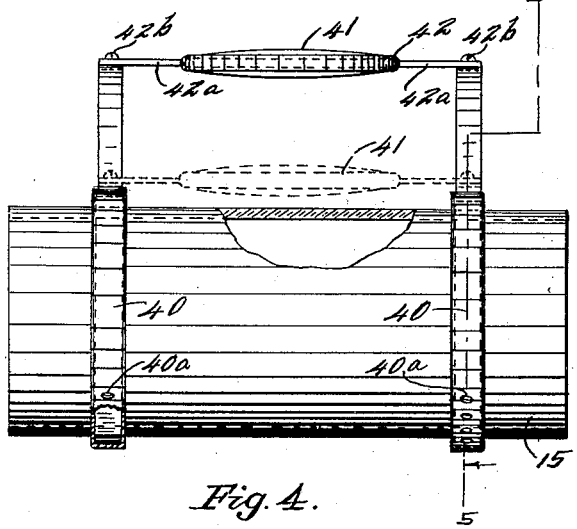
Fig. 4.
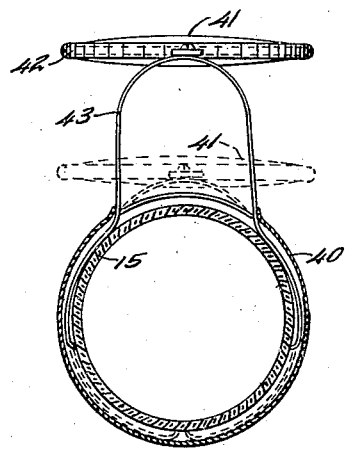
Fig. 5.
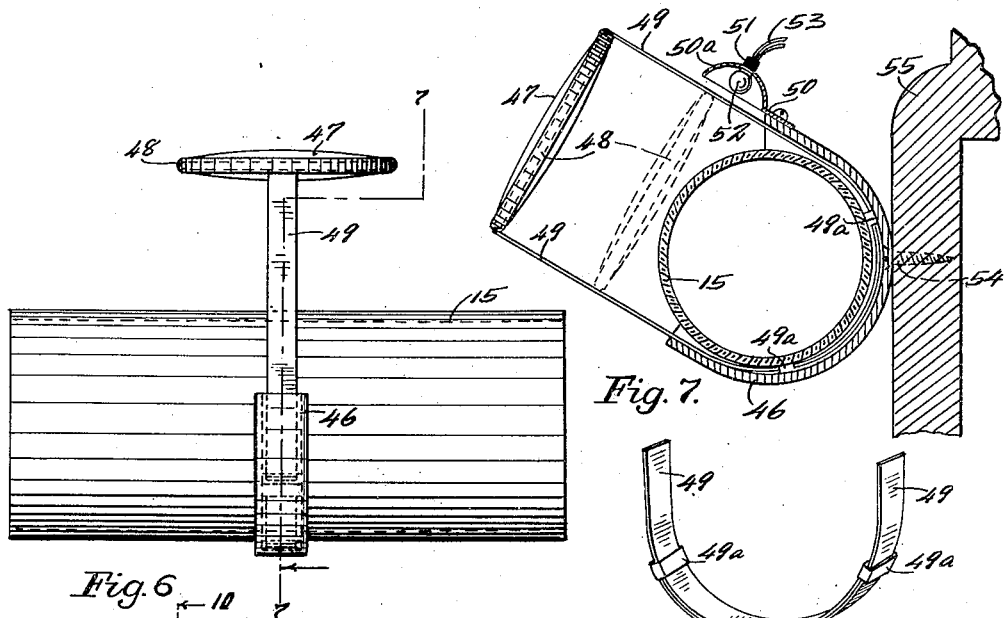
Fig. 6.
Fig. 7.
Fig. 8.
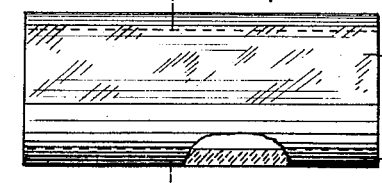
Fig. 9.
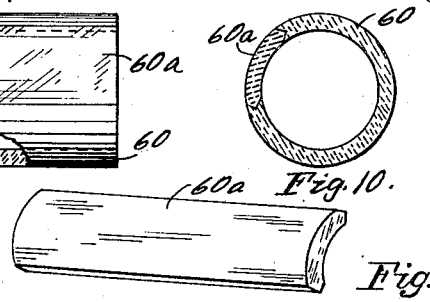
Fig. 10.
Fig. 11.
Inventor
GEORGE V. ERICKSON
BY Chas. C. Reif
Attorney Patented Aug. 13, 1940

2,211,559

UNITED STATES PATENT OFFICE 2,211,559

MAP HOLDING DEVICE

George V. Erickson, Aberdeen, S. Dak.

Application January 11, 1939, Serial No. 250,352

3 Claims. (Cl. 40—19)

This invention relates to a device to be used in or with an automotive vehicle whereby a map or other guide may be easily and conveniently observed by the driver or other party in said vehicle. It is often necessary when traveling in unfamiliar places to very frequently consult a road map to maintain the proper route. It is difficult for the driver to handle a map and at the same time pay proper attention to driving. The device can be used on airplanes and motorcycles.

It is an object of this invention to provide a very simple and efficient device by means of which the portion of a road map or guide showing the section being traveled can be easily observed by the driver without detracting appreciably from his attention to driving.

It is a further object of the invention to provide such a device comprising a container for holding a map having a transparent portion through which the desired part of the map may be viewed together with a magnifying means for enlarging said portion so that the driver can easily and conveniently view the desired portion of the map.

It is still another object of the invention to provide such a device as set forth in the preceding paragraph together with means for conveniently and movably mounting said magnifying means and means for illuminating the portion of the map to be viewed.

These and other objects and advantages of the invention will be fully set forth in the following description made in connection with the accompanying drawings in which like reference characters refer to similar parts throughout the several views and in which:

Fig. 4 is a view in front elevation of a modified form of the device, a part being broken away and another part being shown in vertical section;

Fig. 5 is a vertical section taken substantially on line 5—5 of Fig. 4 as indicated by the arrow;

Fig. 6 is a view in front elevation of another modification;

Fig. 7 is a vertical section taken substantially on line 7—7 of Fig. 6 as indicated by the arrows;

Fig. 8 is a perspective view of a portion of the device shown in Figs. 6 and 7;

Fig. 9 is a view in front elevation of another modified form of the device;

Fig. 10 is a vertical section taken on line 10—10 of Fig. 9 as indicated by the arrows; and Fig. 11 is a perspective view of a part of the device shown in Figs. 9 and 10.

Figure 1:
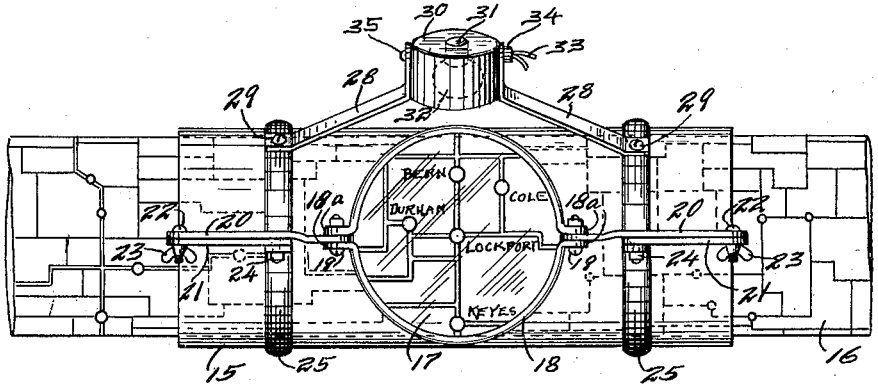
Fig. 1 is a top plan view of the device.
Figure 2:
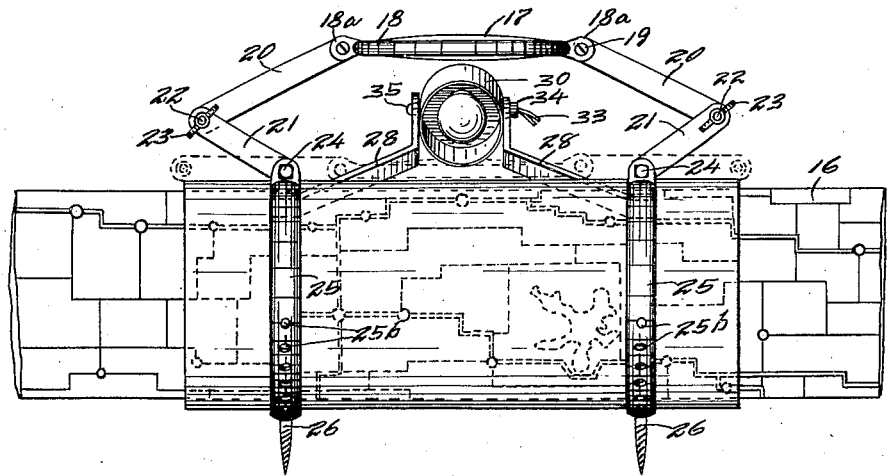
Fig. 2 is a view in front elevation.
Figure 3:
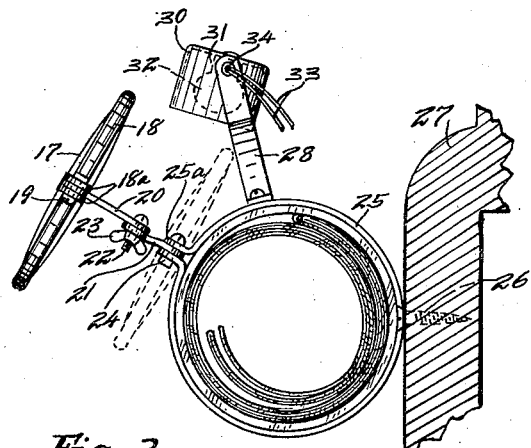
Fig. 3 is a view in end elevation showing a portion of the instrument board of the automobile in vertical section.

Referring to the drawings, particularly Figs. 1 to 3, a device is shown comprising a container 15. While this container might take various forms, in the embodiment of the invention illustrated it is shown as in the form of an open-ended cylinder, which cylinder is made of some transparent material such as glass. Said cylinder is conveniently adapted to receive a map 16 shown as in the form of the ordinary road map. The map 16 can conveniently be rolled in a cylindrical form and placed in the container 15 so that the part of the map showing the section being traveled can be viewed through the top of container 15. In order that the part of the map to be viewed can be easily and clearly seen, a magnifying means is provided comprising a double convex lens 17. Lens 17 has a rim 18 extending thereabout formed of two semi-circular portions having projecting parallel ears 18a at opposite sides through which extend small headed and nutted bolts 19. Bolts 19 also extend through links 20 disposed between ears 18a. Links 20 extend at opposite sides of the lens 17 and are in turn pivotally connected to other links 21 respectively by headed and nutted bolts 22 shown as having wing nuts 23 thereon. Links 21 are pivotally connected at their other ends by headed and nutted bolts 24 to circular members 25 extending about and in contact with container 15. Members 25 have ears 25a formed at their ends extending in parallel relation between which the ends of links 21 are disposed and through which the bolts 24 pass. The members 25 are provided with a plurality of holes 25b and a screw 26 is adapted to extend through one of the holes 25b to secure container 15 to the dash or instrument board 27 of the automobile. Brackets 28 are secured by small screws 29 to members 25 respectively and at their other ends are secured to a cup-like casing 30 arranged to contain a lamp socket 31 adapted to receive a small electric lamp bulb 32. If desired, casing 30 may be arranged as a reflector. Conductors 33 extend to the socket 31 and these may conveniently be brought through an aperture in a hollow stud 34 forming the securing means for one of the brackets 28. The other bracket 28 is secured to casing 30 by a small screw 35.

In operation, when the device is not being used, a lens 17 can be disposed closely adjacent the container 25 as shown by the dotted line position thereof in Fig. 3. When the device is to be used the map 16 will be adjusted to bring the desired portion to the top of container 15 and under lens 17. The lens can be adjusted so that it will be positioned at the correct distance from container 15 to give a sharp focus on the portion of the map being viewed. The said portion of the map will also be illuminated by the lamp 32 which can be controlled from any suitable switch (not shown), which lamp will be supplied with current from the battery of the automobile. The portion of the map showing the section being traveled will thus be conveniently positioned to be viewed by the driver and he can see the map at a glance and will be able to follow the desired routes without unduly taking his attention from his driving. The desired tension on the links 20 and 21 which form toggle links can be secured by adjusting the wing nuts 23.

In Figs. 4 and 5 a similar container 15 is shown about which are disposed two semi-cylindrical casings 40. A lens 41 is provided similar to lens 17 already described, the same having a rim 42 secured about its edge from each end of which extends a small strip or bar 42a. Bars 42a are each secured at their outer ends by small screws 42b to flexible strips 43. Each strip 43 is bowed at the portion secured to the bar 42a and has its end portions extending to and into casing 40 about container 15. The structure is such that the lens 41 can be moved toward and from container 15, the strips 43 flexing and sliding into the space about container 15 within the casings 40. The casings 40 are provided with a plurality of openings 40a through one of which a fastening screw will pass to secure container 15 to the instrument board of the automobile.

The operation of the device shown in Figs. 4 and 5 will be readily understood from the description already given. When the lens 41 is not being used it will be moved down close to container 15. When it is to be used it will be moved upward to the desired distance and will be held in this position. The map in container 15 can thus be conveniently seen.

In Figs. 6, 7 and 8 another slightly modified form of the invention is shown in which the container 15 is again used, the same being tightly fitted in the sides of a casing 46 which is disposed centrally longitudinally of the casing 15. Casing 46 is open at its upper end, the same being substantially U-shaped in vertical cross section. A lens 47 is provided having a rim 48 thereabout to the opposite sides of which are connected flexible strips 49. These extend from lens 47 in parallel relation to and into casing 46. Each strip has a loop 49a at its end forming a guide for the other strip, said strips overlapping in container 46. A bracket 50 is secured to one side of casing 46 having a semi-spherical reflector forming portion 50a adapted to receive a lamp socket 51. A lamp bulb 52 is secured in socket 51, which socket has connected thereto the usual electrical conductors 53 which will be connected to the battery of the automobile. Casing 46 is secured by screw 54 to the instrument board 55 of the automobile. It will be noted that screw 54 is countersunk in casing 46.

In operation lens 47 can be moved toward and from container 15 by merely pulling or pushing upon the same, the strips 49 sliding in casing 46 and in contact with each other. When said lens is not being used it will be disposed close to conductor 15 in the dotted line position shown in Fig. 7. When it is to be used it can be pulled upward and positioned to the correct focal point. The map will be placed in container 15 and the portion to be viewed will be magnified by lens 47 and will be illuminated by lamp 52.

In Figs. 9, 10 and 11 a container 60 is provided which may be of transparent or non-transparent material and the same has set or inserted therein a lens portion 60a. With this construction the map in container 60 will be magnified by the lens 60a which will always be in one position.

From the above description it will be seen that I have provided a very simple and yet very convenient and efficient map holder device by means of which the driver can view the desired portion of the map without interfering with his driving. The device is easily made and can be conveniently and easily installed at the desired part of the automobile. The device is small so that when it is not in use it is not objectionably in the way. It will be obvious that the device can be finished in a very desirable manner so that it will be neat and attractive.

The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. In a map holding device adapted to be carried on an automobile in front of the driver so as to be observed by him, the combination of a transparent cylindrical container having an open end through which a folded or rolled map may be inserted, means for securing said container to the instrument board of said automobile, a magnifying lens disposed above said container, a casing secured to said container, flexible members secured to and supporting said lens and movable into said casing to position said lens at different distances from said container.

2. In a map holding device adapted to be carried on an automobile in front of the driver so as to be observable by him, the combination of a transparent cylindrical container having an open end through which a folded or rolled map may be inserted, a pair of members embracing said container and spaced thereon, a magnifying lens disposed above said container, toggle links connecting said lens to said members whereby said lens may be positioned at the desired distance from said container for properly magnifying said map or be disposed close to said container in inoperative condition and means for securing said spaced members to said automobile.

3. In a map holding device adapted to be connected to an automotive vehicle in front of a driver so as to be observable by him, the combination of a container for receiving a map, said container being in the form of a tube having open ends into which a rolled or folded map may be inserted and moved longitudinally therein, said container having a transparent top portion through which a portion of said map may be viewed, a magnifying lens disposed above said portion, spaced members on said container from which said lens is supported and members secured to spaced points on said lens and connected to said first mentioned members respectively and movable relatively thereto toward and from said container so that said lens can be moved toward and from said container for focal adjustment and can be placed in inoperative position closely adjacent said container.

GEORGE V. ERICKSON.